(12) United States Patent
Janakiraman et al.

(10) Patent No.: US 9,660,938 B2
(45) Date of Patent: May 23, 2017

(54) TWO-STAGE PORT-CHANNEL RESOLUTION IN A MULTISTAGE FABRIC SWITCH

(71) Applicant: Cisco Technology, Inc., San Jose, CA (US)

(72) Inventors: Rajagopalan Janakiraman, Cupertino, CA (US); Shyam Kapadia, Santa Clara, CA (US); Nilesh Shah, Fremont, CA (US); Chia Tsai, Cupertino, CA (US); Vinay Parameswarannair, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 188 days.

(21) Appl. No.: 14/557,670

(22) Filed: Dec. 2, 2014

(65) Prior Publication Data
US 2015/0085859 A1    Mar. 26, 2015

Related U.S. Application Data

(62) Division of application No. 13/589,311, filed on Aug. 20, 2012, now Pat. No. 8,902,888.

(51) Int. Cl.
*H04L 12/28* (2006.01)
*H04L 12/947* (2013.01)
*H04L 12/933* (2013.01)
*H04L 12/743* (2013.01)
*H04L 12/741* (2013.01)

(52) U.S. Cl.
CPC ............. *H04L 49/25* (2013.01); *H04L 45/74* (2013.01); *H04L 45/7453* (2013.01); *H04L 49/10* (2013.01)

(58) Field of Classification Search
CPC ....... H04L 12/28; H04L 49/30; H04L 49/256; H04L 49/00; H04L 49/10; H04L 49/25; H04L 49/252; H04L 45/22; H04L 45/245; H04L 45/66; H04L 45/00; H04L 45/08; H04L 49/15; H04L 49/208
USPC ....... 370/389, 396, 388, 392, 351, 386, 400, 370/395.31, 395.32
See application file for complete search history.

(56) References Cited

U.S. PATENT DOCUMENTS

| | | | |
|---|---|---|---|
| 6,243,360 B1 | 6/2001 | Basilico | |
| 8,098,574 B2 * | 1/2012 | Southworth | ........ H04L 49/3009 370/217 |
| 8,467,294 B2 * | 6/2013 | Raman | ................... H04L 47/125 370/235 |
| 8,804,531 B2 * | 8/2014 | Kapadia | ................. H04L 47/125 370/230 |
| 8,902,888 B2 * | 12/2014 | Janakiraman | ........... H04L 49/10 370/389 |
| 9,036,629 B2 * | 5/2015 | York | ...................... H04L 45/245 370/389 |
| 2006/0263087 A1 * | 11/2006 | Dropps | .................. H04L 47/286 398/51 |
| 2013/0287020 A1 | 10/2013 | York | |
| 2013/0308455 A1 | 11/2013 | Kapadia et al. | |
| 2014/0050217 A1 | 2/2014 | Janakiraman et al. | |

* cited by examiner

*Primary Examiner* — Hanh N Nguyen
(74) *Attorney, Agent, or Firm* — Merchant & Gould P.C.

(57) ABSTRACT

In some embodiments, a data packet may be received at a leaf switch. A port-channel associated with a destination port for the data packet may be identified, and the data packet may be transmitted to the destination port via the identified port-channel.

19 Claims, 4 Drawing Sheets

TWO-STAGE PORT-CHANNEL RESOLUTION IN A MULTISTAGE FABRIC SWITCH

RELATED APPLICATION

This application is a Divisional of co-pending U.S. application Ser. No. 13/589,311 entitled "Two-Stage Port-Channel Resolution in a Multistage Fabric Switch" filed Aug. 20, 2012, which is incorporated herein by reference.

BACKGROUND

In large-scale data center architectures, a number of leaf, or top-of-rack (TOR) switches may be unified across a fabric network using multi-stage packet forwarding. Thousands of ports, connecting other networks and/or end devices, may be served by the leaf switches connected by a fabric comprising a single large switch and/or a number of interconnected spine switches. The ports connected to the leaf switches may be multi-homed through port-channels (also called link aggregation groups or LAGs)—virtual interfaces with multiple physical links—to provide resiliency in the form of load-balancing, fault-tolerance, redundancy, increased bandwidth, etc. Across a large datacenter, a large number of port-channels, on the order of N/2 for every N ports, must be supported so that every leaf switch can forward traffic to anywhere in the datacenter network. Current implementations have limited table space that may be able to support only a few hundred port-channels, which limits the ability to scale the number of port-channels.

BRIEF DESCRIPTION OF THE DRAWINGS

The accompanying drawings, which are incorporated in and constitute a part of this disclosure, illustrate various embodiments of the present disclosure. In the drawings.

DETAILED DESCRIPTION

Overview

Figure 1:
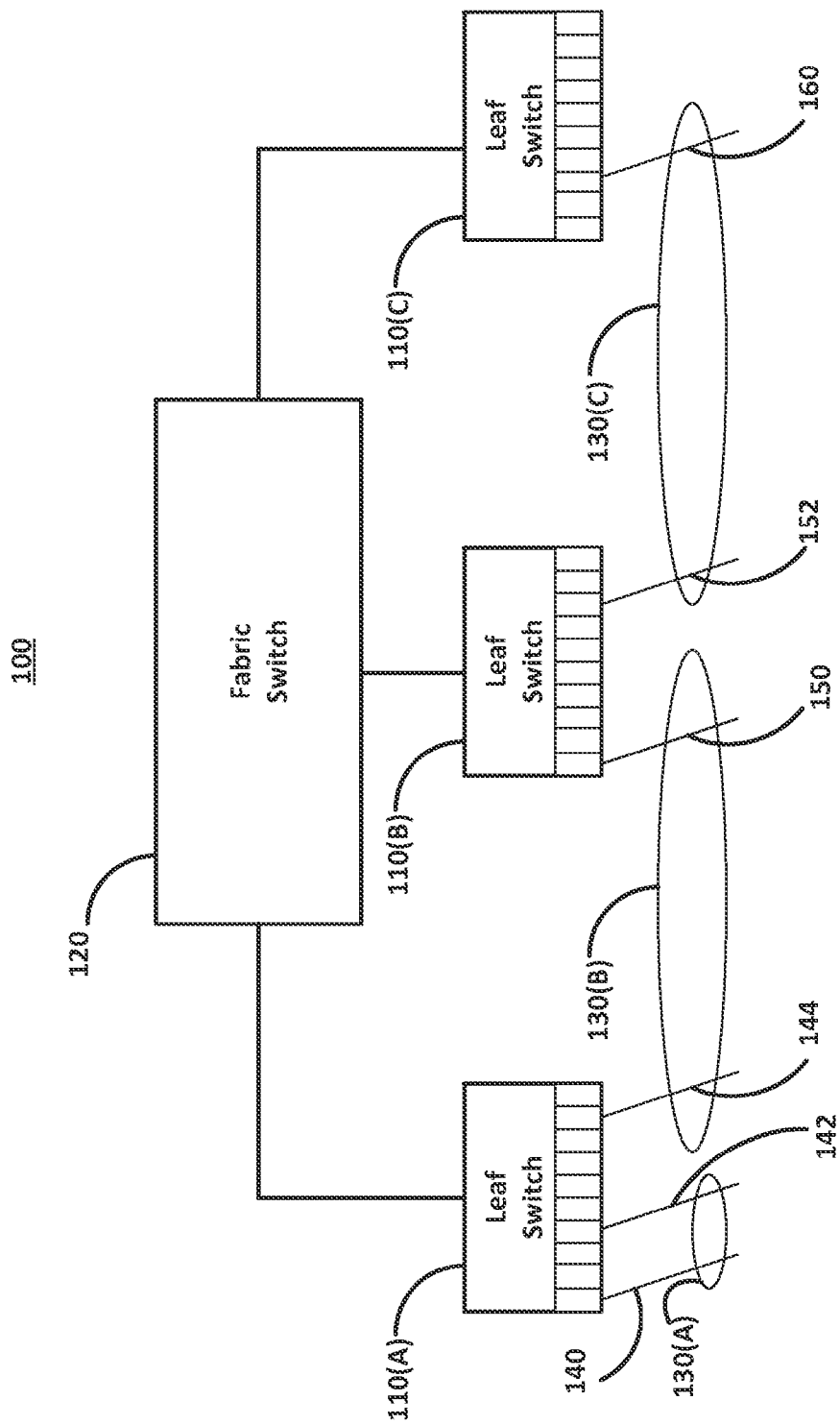
FIG. 1 is a block diagram of an operating environment.

Consistent with embodiments of the present disclosure, systems and methods are disclosed for two-stage lag resolution in a multistage fabric switch.

In some embodiments, a data packet may be received at a leaf switch. A port-channel associated with a destination port for the data packet may be identified, and the data packet may be transmitted to the destination port via the identified port-channel. The identified port-channel may undergo a two stage port-channel resolution where the leaf switch resolves for port-channels that have at least one local member and the fabric resolves all the port-channels to the destination leaf switch based on flow hash.

It is to be understood that both the foregoing general description and the following detailed description are examples and explanatory only, and should not be considered to restrict the disclosure's scope, as described and claimed. Further, features and/or variations may be provided in addition to those set forth herein. For example, embodiments of the disclosure may be directed to various feature combinations and sub-combinations described in the detailed description.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

A two-stage port-channel resolution scheme may be provided between a leaf switch and a fabric switch. In this scheme, each port-channel may be assigned a unique global index that is recognized by the fabric switch and a local index that is recognized in leaf switches that have at least one member port on the port-channel. As a packet is sent from the leaf to the fabric, the local index within the ingress leaf switch may be mapped to the global index. When the packet exits the fabric to the egress leaf switch, the global index may be reverse mapped to the local index. Each leaf switch may use a different local index that each map to the same global-index for the same port-channel and/or the same local index may be re-used in multiple leaf switches.

If a packet is destined for a port-channel that has no member port in the ingress leaf switch, no local index may be used. The port-channel may be represented using its global index, as with any other physically remote port, and no port-channel resolution need be performed before the packet is forwarded to the fabric. The number of local indices needed per leaf may comprise the number of port-channels on which the physical ports of the leaf can have at least one member that is equal to the number of the physical ports supported in the leaf switch. In the leaf switch, the port-channel table is looked up only for port-channels with local index. So, the port-channel table space may support a few tens of port-channels equal to the number of physical ports in the leaf switch instead of the several hundreds/ thousands of port-channels needed to address all the port-channels in the entire system using traditional methods.

Every port in the architecture, including port-channels, may be assigned a unique global index (e.g., G1,G2 . . . ) for use within the fabric. Traffic may be switched from one fabric port to another based on this global index and resolution via the fabric's port table if the index refers to a regular port and the fabric's port-channel table if the index refers to a port-channel. If the global index falls within the port-channel range, the fabric port-channel table is looked up using an appropriate flow hash to pick the egress fabric port leading to one of the leaf switches that has a member in the port-channel. The flow hash may be generated by a leaf and honored within the fabric and/or the fabric itself may generate the flow-hash based on the packet parameters.

In the leaf switch, physical ports may be identified by the unique global (G) index and may use the port table to find the point of exit. Port-channels that do not have any local members on a given leaf switch may be treated like remote physical ports and referenced using the global index. A lookup on this global index on the port table results in a port leading to the fabric for both remote ports and remote port-channels. Port-channels that have at least one local physical port may be referenced by the local index within the leaf rather than the global index. The local index may be used to lookup into the leafs port-channel table rather than the port table. The local index, along with the generated flow hash, may be used for the port selection.

For a distributed port-channel with port-channel member ports across multiple leaf switches, there are several possibilities. For example, the flow hash may select a local physical port and the lookup into the port-channel member table yields the global index of the selected port that in turn indexes the port table to give the physical egress port. For another example, the flow hash may result in a port on a remote leaf switch, and a fabric uplink port may be selected. The local index may be swapped with the corresponding global index before the packet is transmitted to the fabric. This may be achieved by programming the global index of the port-channel into the port-channel member table for all remote members.

FIG. 1 is a block diagram view of an operating environment 100 for providing two-stage port-channel resolution. Operating environment 100 may comprise a plurality of leaf switches 110(A)-(C) in communication with a fabric switch 120. Leaf switches 110(A)-(C) may communicate via a plurality of port-channels 130(A)-(C). For example, a first local port 140 and a second local port 142 of leaf switch 110(A) may both be members of first port-channel 130(A). A third local port 144 of leaf switch 110(A) and a fourth local port 150 of leaf switch 110(B) may be members of second port-channel 130(B). A fifth local port 152 of leaf switch 110(B) and a sixth local port 160 of leaf switch 110(C) may be members of third port-channel 130(C).

First port-channel 130(A) may be identified by a first global index in fabric switch 120, second leaf switch 110(B) and third leaf switch 110(C); in first leaf switch 110(A), first port-channel 130(A) may be identified by a first local index as the switch has local port members of the channel—first local port 140 and second local port 142. Second port-channel 130(B) may be identified by a second global index in fabric switch 120 and third leaf switch 110(C); in first leaf switch 110(A), the second port-channel 130(B) may be identified by a second local index and in the second leaf switch 110(B), second port-channel 130(B) may be identified by a first local index as both first leaf switch 110(A) and second leaf switch 110(B) have local port members of the port-channel—third local port 144 and fourth local port 150. Consistent with embodiments of this disclosure, first leaf switch 110(A) and second leaf switch 110(B) may use the same local index for second port-channel 130(B) or they may use different local indices. Similarly, third port-channel 130(C) may be identified by a third global index in fabric switch 120 and in first leaf switch 110(A); in second leaf switch 110(B) and in third leaf switch 110(C), third port-channel 130(C) may be identified by a third local index as both second leaf switch 110(B) and third leaf switch 110(C) have local port members of the port-channel—fifth local port 152 and sixth local port 160. Each local port (140, 142, 144, 150, 152, and 160) may comprise a physical network port connecting its respective leaf switch 110(A)-(C) to another network device, such as another switch, a router, and/or an endpoint device such as a server and/or another computing device.

A mapping table may be stored on each leaf switch 110(A)-(C) that may be used to map local indices to global indices and vice versa as packets are sent to or received from fabric switch 120. The size of the mapping table may be equal to the maximum number of front panel ports in each leaf switch 110(A)-(C), as the table may be used for port-channels that have at least one local port member, such as first local switch 110(A) having third local port 144 as a member of second port-channel 130(B).

Figure 2:
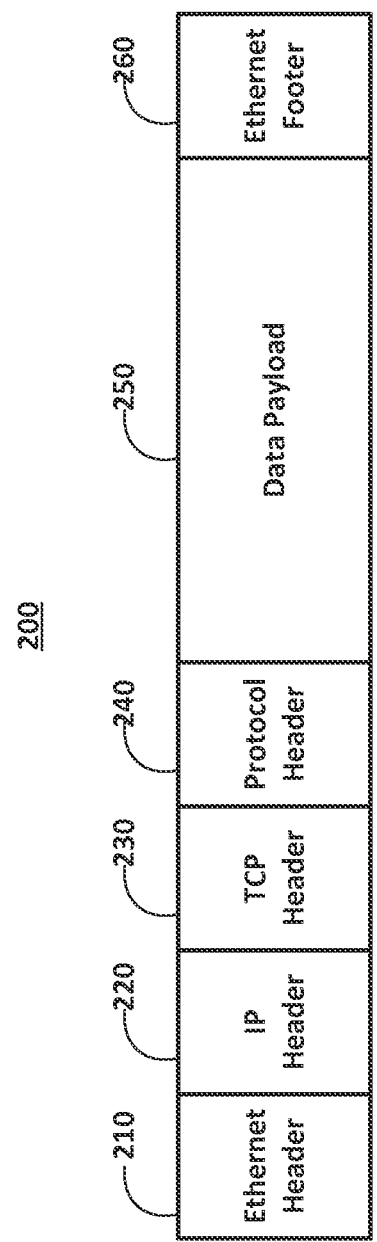
FIG. 2 is a block diagram illustrating an example data packet.

FIG. 2 is a block diagram of an example data packet 200. Data packet 200 may comprise a plurality of segments such as an Ethernet header 210, an Internet Protocol (IP) header 220, a Transmission Control Protocol header 230, a protocol header 240, a data payload 250, and an Ethernet footer 260. The header segments of data packet 200 may comprise information regarding sender and destination addresses and ports, sizes, versions, packet length, checksums, sequence numbers, flags, etc. For example, Ethernet header 210 may comprise information associated with OSI layer 2 data, such as a sender's and/or recipient's MAC address. IP header 220 may be associated with information related to OSI layer 3 data, such as error-handling headers (e.g., a time-to-live value representing a number of hops the packet may traverse before being dropped.) Protocol header 250 may comprise protocol-specific information about the content of data payload 250. For the Hypertext Transport Protocol (HTTP), for example, such information may comprise accept-encoding, cache-control, content-type, etc. Data packet 200 may be transmitted among the various elements depicted in operating environment 100.

Figure 3:
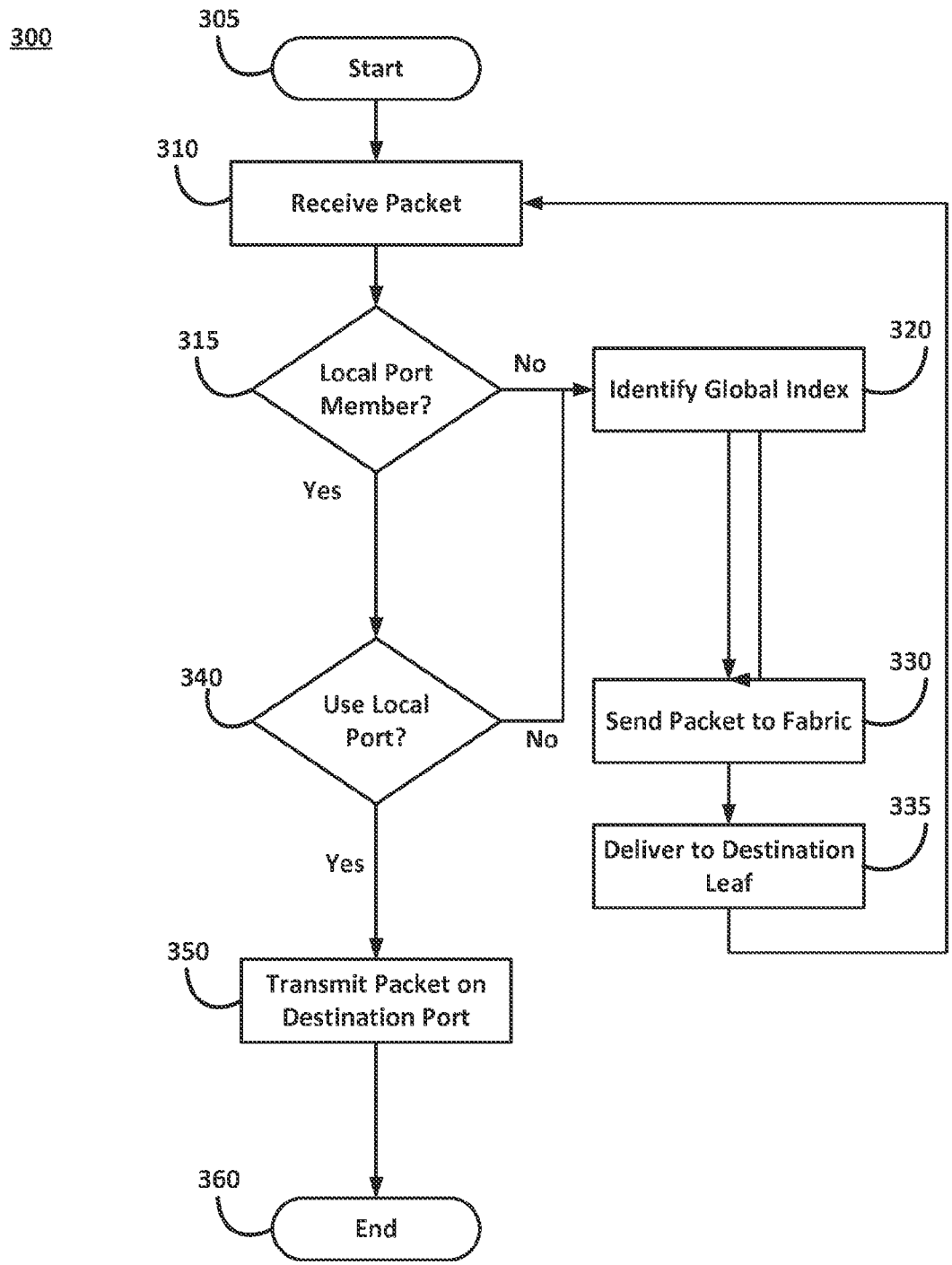
FIG. 3 is a flow chart illustrating a method for providing two stage port-channel resolution.

FIG. 3 illustrates a flow chart setting forth the general stages involved in a method 300 consistent with an embodiment of the disclosure for providing redundancy elimination in web caching. Method 300 may be implemented using the components illustrated in operating environment 100 as described above. Ways to implement the stages of method 300 will be described in greater detail below. Method 300 may begin at starting block 305 and proceed to stage 310 where computing device 400 may receive a data packet. For example, first leaf switch 110(A) may receive data packet 200 comprising HTTP data.

Method 300 may then advance to stage 315 where computing device 400 may determine whether the packet is destined for a port-channel with which at least one local port is associated. For example, if data packet 200 is destined for an endpoint device located on second port-channel 130(B), then first leaf switch 110(A) and second leaf switch 110(B) would comprise local ports that are members of that port-channel, which third leaf switch 110(C) would not.

If no local ports are members of the destination port-channel, method 300 may advance to stage 320 where computing device 400 may identify a global index associated with the destination port-channel. For example, data packet 200 may be received by first leaf switch 110(A) destined for third port-channel 130(C), which has no local port members. In the leaf switch, physical ports may be identified by the unique global index, and a port table may be used to find an exit port. Port-channels that do not have any local port members may be treated like remote physical ports, and may be referenced by their global indices. This global index may be used to select an uplink port leading to the fabric switch. When a local physical port is a member of the port-channel, however, a translation may be made based on a port-channel table within the leaf switch between the port-channel's local index within the leaf switch and the global index used by fabric switch 120.

Method 300 may then advance to stage 330 where computing device 400 may transmit the data packet to the fabric switch. For example, data packet 200 may have a next-hop value set to the global index of the desired port-channel and may be transmitted on an uplink port to fabric switch 120.

Method 300 may then advance to stage 335 where computing device 400 may deliver the packet to the destination leaf switch. For example, fabric switch 120 may use a flow channel hash to look up an egress fabric port in the fabric switch's port-channel table. The data packet may then be transmitted on the egress port to a leaf switch having a physical port member of the destination port-channel. Method 300 may then return to stage 310, where the receiving leaf switch may perform a new iteration of Method 300.

If, at stage 315, computing device 400 determines that the leaf switch does have a local port member on the destination port-channel, method 300 may advance to stage 340 where computing device 300 may determine whether a local physical port should be used to transmit the data packet. For example, port-channels with no local port members will be identified by a global index associated with a port leading to fabric switch 200 in the port table, while port-channels with a local port member will be identified with a local index that identifies the port-channel in the leaf switch's port-channel table. This local index, along with a generated flow hash, may be used as a lookup value into the leaf switch's port-channel table to select a port member.

If, at stage 340, the lookup selects a port member on a remote leaf switch, an appropriate fabric switch uplink port may be selected and the local index of the port-channel may be swapped for the port-channel's global index. Method 300 may then proceed to stage 320, as described above.

If the lookup selects a local physical port, however, method 300 may advance to stage 350 where the data packet may be transmitted on the selected port. For example, first leaf switch 110(A) may select second local port 142 as the destination port and transmit data packet 200 on that port to the destination. Method 300 may then end at stage 360.

Figure 4:
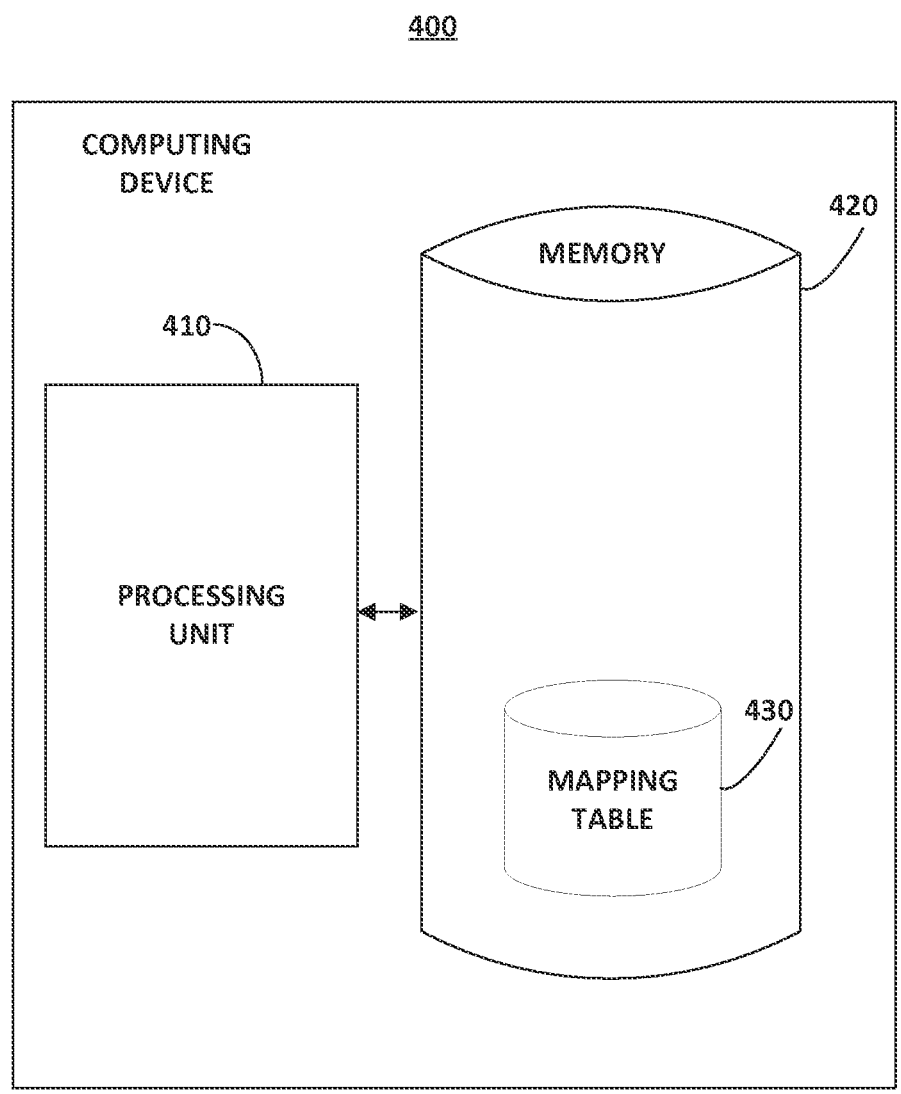
FIG. 4 is a block diagram illustrating components of a computing device.

FIG. 4 illustrates computing device 400 comprising a processing unit 410 and a memory unit 420. Memory 420 may include a mapping table 430. While executing on processing unit 410, these and other software modules and/or data sources may perform processes for providing redundancy elimination in web caching, for example, via one or more stages included in method 300 described above with respect to FIG. 3. Moreover, any one or more of the stages included in method 300 may be performed on any element shown in operating environment 100 and each of the elements illustrated in operating environment 100 may comprise a similar computing device to that illustrated by FIG. 4.

Computing device 400 may be implemented using a personal computer, a network computer, a mainframe, or other similar microcomputer-based workstation. The processor may comprise any computer operating environment, such as hand-held devices, multiprocessor systems, microprocessor-based or programmable sender electronic devices, minicomputers, mainframe computers, and the like. The processor may also be practiced in distributed computing environments where tasks are performed by remote processing devices. Furthermore, the processor may comprise a mobile terminal, such as a smart phone, a cellular telephone, a cellular telephone utilizing wireless application protocol (WAP), personal digital assistant (PDA), intelligent pager, portable computer, a hand held computer, a conventional telephone, a wireless fidelity (Wi-Fi) access point, or a facsimile machine. The aforementioned systems and devices are examples and the processor may comprise other systems or devices.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, or other forms of RAM or ROM. Further, the disclosed methods' stages may be modified in any manner, including by reordering stages and/or inserting or deleting stages, without departing from the disclosure.

All rights including copyrights in the code included herein are vested in and the property of the Applicant. The Applicant retains and reserves all rights in the code included herein, and grants permission to reproduce the material only in connection with reproduction of the granted patent and for no other purpose.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. An apparatus comprising:
    a memory storage; and
    a processor coupled to the memory storage, the processor operative to:
        receive a data packet that is destined for a destination port-channel,
        determine whether the destination port-channel does not comprise a local physical port, and
        in response to determining that the destination port-channel does not comprise the local physical port:
            identify a global index associated with the destination port-channel, wherein each port-channel of a fabric is assigned a unique global index that is recognized by a fabric switch and is recognized by a leaf switch that has no member port on the port-channel, and wherein the port-channel is further assigned an unique local index that is recognized by one or more leaf switches that has at least one member port on the port-channel;
            set a header value in the data packet to the identified global index associated with the destination port-channel; and
            forward the data packet to a fabric switch associated with the destination port-channel.

2. The apparatus of claim 1, wherein the header value comprises a Layer 3 next-hop value.

3. The apparatus of claim 1, wherein the processor is further operative to:
    determine whether a Layer 2 forwarding table stored in the memory storage comprises a MAC address associated with a source port-channel associated with the data packet; and
    in response to determining that the Layer 2 forwarding table stored in the memory storage does not comprise the MAC address associated with the source port-channel associated with the data packet, create an entry in the Layer 2 forwarding table associating the MAC address with the source port-channel.

4. An apparatus comprising:
a memory storage; and
a processor coupled to the memory storage, the processor operative to:
receive a data packet that is destined for a destination port-channel,
determine whether the destination port-channel comprises a local physical port, and
in response to determining that the destination port-channel comprises the local physical port:
identify a local index associated with the destination port-channel, wherein each port-channel of a fabric is assigned a unique global index that is recognized by a fabric switch and is recognized by a leaf switch that has no member port on the port-channel, and wherein the port-channel is further assigned an unique local index that is recognized by one or more leaf switches that has at least one member port on the port-channel;
select a destination port for the data packet according to the local index; and
transmit the data packet to the selected destination port.

5. The apparatus of claim 4, wherein the selected wherein the destination port comprises a plurality of physical network ports.

6. The apparatus of claim 4, wherein the processing unit is further operative to:
select a remote port associated with a second apparatus as the destination port for the data packet;
map the local index to the unique global index associated with the destination port-channel;
set the header value in the data packet to the unique global index associated with the destination port-channel; and
forward the data packet to the fabric switch.

7. The apparatus of claim 4, wherein the apparatus comprises one of a plurality of apparatuses in communication with the fabric switch.

8. The apparatus of claim 4, wherein the apparatus comprises a first port channel, a second port channel, and a third port channel, wherein the first port channel comprises network ports located on a first leaf switch, wherein the second port channel comprises network ports located on the first leaf switch and a second network switch, and wherein the third port channel comprises network ports located on the second leaf switch and a third leaf switch.

9. The apparatus of claim 8, wherein the first port channel is associated with a first global index and a first local index, wherein the second port channel is associated with a second global index and a second local index, and wherein the third port channel is associated with a third global index and a third local index.

10. The apparatus of claim 9, wherein:
the first global index is identified by the fabric, the second leaf switch and the third leaf switch, and the first local index is identified by the first leaf switch;
the second global index is identified by the fabric and the third leaf switch, and the second local index is identified by the first leaf switch and the second leaf switch; and
the third global index is identified by the fabric and the first leaf switch, and the third local index is identified by the second leaf switch and the third leaf switch.

11. The apparatus of claim 8, wherein the second port channel and the third port channel are distributed port channels.

12. The apparatus of claim 4, wherein the fabric is associated with a plurality of leaf switches, and wherein each of the plurality of leaf switches comprises a mapping table which maps the unique local index and the unique global index.

13. A method comprising:
receiving, at a processor, a data packet that is destined for a destination port-channel;
determining that the destination port-channel does not comprise a local physical port; and
in response to determining that the destination port-channel does not comprise a local physical port;
identifying a global index associated with the destination port-channel, wherein each port-channel of a fabric is assigned a unique global index that is recognized by a fabric switch and is recognized by a leaf switch that has no member port on the port-channel, and wherein the port-channel is further assigned an unique local index that is recognized by one or more leaf switches that has at least one member port on the port-channel,
setting a header value in the data packet to the identified global index associated with the destination port-channel, and
forwarding the data packet to a fabric switch associated with the destination port-channel.

14. The method of claim 13, wherein setting the header value comprises setting the header value wherein the header value comprises a Layer 3 next-hop value.

15. The method of claim 13, further comprising:
determining that a Layer 2 forwarding table stored in the memory storage does not comprise a MAC address associated with a source port-channel associated with the data packet; and
in response to determining that the Layer 2 forwarding table stored in the memory storage does not comprise the MAC address associated with the source port-channel associated with the data packet, create an entry in the Layer 2 forwarding table associating the MAC address with the source port-channel.

16. A method comprising:
receiving, at a processor, a data packet that is destined for a destination port-channel;
determining that the destination port-channel comprises a local physical port; and
in response to determining that the destination port-channel comprises a local physical port:
identifying a local index associated with the destination port-channel, wherein each port-channel of a fabric is assigned a unique global index that is recognized by a fabric switch and is recognized by a leaf switch that has no member port on the port-channel, and wherein the port-channel is further assigned an unique local index that is recognized by one or more leaf switches that has at least one member port on the port-channel;
selecting a destination port for the data packet according to the local index; and
transmitting the data packet to the selected destination port.

17. The method of claim 16, wherein selecting the destination port comprises selecting the destination port wherein the destination port comprises a plurality of physical network ports.

18. The method of claim 16, further comprising:
selecting a remote port associated with a second apparatus as the destination port for the data packet;
mapping the local index to the unique index associated with the destination port-channel;
setting the header value in the data packet to the unique global index associated with the destination port-channel; and
forwarding the data packet to the fabric switch.

19. The method of claim 16, wherein the apparatus comprises one of a plurality of apparatuses in communication with the fabric switch.

* * * * *